US011160035B2

(12) United States Patent
Ibrahim et al.

(10) Patent No.: US 11,160,035 B2
(45) Date of Patent: Oct. 26, 2021

(54) CENTRALIZED METHOD FOR ALLOCATING TRANSMISSION RESOURCES TO D2D TERMINALS IN A CELLULAR ACCESS NETWORK

(71) Applicant: ORANGE, Issy-les-Moulineaux (FR)

(72) Inventors: Rita Ibrahim, Chatillon (FR); Berna Sayrac, Chatillon (FR); Mohamad Assaad, Gif sur Yvette (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 17/056,173

(22) PCT Filed: May 15, 2019

(86) PCT No.: PCT/FR2019/051101
§ 371 (c)(1),
(2) Date: Nov. 17, 2020

(87) PCT Pub. No.: WO2019/220056
PCT Pub. Date: Nov. 21, 2019

(65) Prior Publication Data
US 2021/0219243 A1  Jul. 15, 2021

(30) Foreign Application Priority Data

May 18, 2018  (FR) .................................... 1854186

(51) Int. Cl.
*H04W 52/26* (2009.01)
*H04W 76/14* (2018.01)
*H04W 52/36* (2009.01)

(52) U.S. Cl.
CPC ......... *H04W 52/267* (2013.01); *H04W 52/36* (2013.01); *H04W 76/14* (2018.02)

(58) Field of Classification Search
CPC ............... H04W 52/267; H04W 52/36; H04W 72/00–14; H04W 76/14; Y02D 30/70
See application file for complete search history.

(56) References Cited

U.S. PATENT DOCUMENTS

| 2014/0133590 A1* | 5/2014 | Ahn ...................... H04W 48/12 375/260 |
| 2014/0324974 A1* | 10/2014 | Park .................... H04L 67/1074 709/204 |

(Continued)

OTHER PUBLICATIONS

International Search Report dated Aug. 27, 2019 for corresponding International Application No. PCT/FR2019/051101, filed May 15, 2019.

(Continued)

*Primary Examiner* — Raymond S Dean
(74) *Attorney, Agent, or Firm* — David D. Brush; Westman, Champlin & Koehler, P.A.

(57) ABSTRACT

A method for allocating transmission resources to at least one terminal of a set of D2D terminals available for direct communication implemented by a cellular access network having a base station. The base station has knowledge of a statistic relating to the state of the D2D channels. The method includes, for a transmission interval: determination, by the base station, of a subset among different subsets of D2D terminals of the set that statistically minimizes a utility function; determination, by each D2D terminal of subset, of a minimum power and a maximum throughput which minimize its utility metric; and determination, by the base station, of a D2D terminal among the D2D terminals of subset, of which the utility function applied to its minimum power and its maximum throughput is minimal, in order to allocate to the terminal spectral resources for transmission during the transmission interval.

9 Claims, 3 Drawing Sheets

(56) References Cited

U.S. PATENT DOCUMENTS

| | | | |
|---|---|---|---|
| 2016/0044665 A1* | 2/2016 | Novlan | H04W 72/0406 370/336 |
| 2016/0242144 A1* | 8/2016 | Adachi | H04W 4/06 |
| 2016/0278120 A1* | 9/2016 | Ro | H04W 72/0406 |
| 2018/0097578 A1* | 4/2018 | Li | H04W 52/241 |
| 2018/0167914 A1* | 6/2018 | Zhang | H04W 72/02 |

OTHER PUBLICATIONS

Written Opinion of the International Searching Authority dated Aug. 27, 2019 for corresponding International Application No. PCT/FR2019/051101, filed May 15, 2019.

Tang Huan et al., "Monotonic optimization for power control of D2D underlay with partial CSI", 2016 IEEE International Conference on Communications (ICC), IEEE, May 22, 2016 (May 22, 2016), pp. 1-6, DOI: 10.1109/ICC.2016.7511619, XP032922774.

Aijaz Adnan et al., "Energy-Efficient Uplink Resource Allocation in LTE Networks With M2M/H2H Co-Existence Under Statistical QoS Guarantees" IEEE Transactions on Communications, IEEE Service Center, Piscataway, NJ. USA, vol. 62, No. 7, Jul. 1, 2014 (Jul. 1, 2014), pp. 2353-2365, [retrieved on Jul. 18, 2014], DOI: 10.1109/TCOMM.2014.2328338, ISSN: 0090-6778, XP011553643.

Rita Ibrahim et al., "When Distributed outperforms Centralized Scheduling in D2D-Enabled Cellular Networks", arxiv.org, Cornell University Library, 201 Olin Library Cornell University Ithica, NY 14853, Jun. 6, 2018 (Jun. 6, 2018), XP080887650.

K. Doppler, M. Rinne, C. Wijting, C. Ribeiro, and K. Hugl, "Device-to-device communication as an underlay to lte-advanced networks," IEEE Commun. Mag., vol. 47, No. 12, pp. 42-49, 2009.

IEEE « Design Aspects of Network Assisted Device-to-Device Communications » by Gábor Fodor, Erik Dahlman, Gunnar Mildh, Stefan Parkvall, Norbert Reider, György Miklós and Zoltán Turányi, published in Mar. 2012 in the Communications Magazine review.

M. J. N. L. Georgiadis and L. Tassiulas, Resource allocation and cross-layer control in wireless 35 networks, 2006, chapter 4 sections 4.4 and 4.5, pp. 49-57.

\* cited by examiner

CENTRALIZED METHOD FOR ALLOCATING TRANSMISSION RESOURCES TO D2D TERMINALS IN A CELLULAR ACCESS NETWORK

CROSS-REFERENCE TO RELATED APPLICATIONS

This Application is a Section 371 National Stage Application of International Application No. PCT/FR2019/051101, filed May 15, 2019, which is incorporated by reference in its entirety and published as WO 2019/220056 A1 on Nov. 21, 2019, not in English.

FIELD OF THE INVENTION

The present invention relates to the field of telecommunications. Within this field, the invention relates more particularly to access networks, and to the allocation of resources for setting up communications.

PRIOR ART

An access network to a telecommunication system comprises an access point which forms the interface between a terminal and the access network. In a cellular access network, sometimes called mobile network, the access point is commonly called base station.

A mobile terminal which wants to set up a communication with a recipient has to be identified by a base station and must ask to be served by the base station. The base station can serve the terminal if it can allocate a spectral resource to said terminal.

Mobile access networks are confronted with an increasing demand for setting up communications which is reflected by an increase in the load of the base station. When the base station has allocated all its spectral resources, it has reached full load. It can no longer serve new terminals until one of its spectral resources has been released.

The concept of direct communications (D2D Device to Device) between two terminals within an access network has been introduced [1].

The base station BS knows the terminals that are active in its radio coverage zone given the interchanges in the signaling channel, sometimes referred to as feedback channel. These terminals are said to be identified. Generally, the base station identifies these terminals by recovering an identifier supplied by any terminal which is seeking to access the access network. Depending on the type of access network, the identifier corresponds for example to the MSISDBN, more commonly referred to as telephone number. The base station also knows the recipients of the communications requested by the various identified terminals. The base station is therefore able to detect pairs of terminals situated in its coverage zone which are seeking to set up a communication and which are therefore likely to implement a direct communication without involving the base station.

A pair of so-called D2D terminals thus sets up a communication without involving the base station. This requires the two terminals to be in proximity to one another, at a maximum distance that is a function of the technology implemented to handle the transmission.

These direct communications are not without any impact on the communications set up via the base station. Indeed, they generate interferences more particularly on the communications of the terminals which share the same spectral resource.

These direct communications make it possible to increase the number of communications beyond the full load of the base station and therefore make it possible to improve the spectral efficiency of the access network.

The knowledge by the base station of the state of the propagation channel makes it possible to adapt the allocation of the resources and improve the performance levels of the communications set up by the access network. However, the base station cannot know the state of all the channels without overloading the signaling between the terminals and the base station.

The authors of [2] propose a resource allocation model which only takes account of a statistic of the channels and which optimizes the energy efficiency of the users subject to the constraint of their quality of service (bit rate) in a scenario in which the D2D communications are authorized. Thus [2] breaks down the optimization problem into dual problems and resolves these problems by means of an iterative algorithm. This approach, which is highly complex in terms of number of calculations, gives a sub-optimal solution.

SUMMARY OF THE INVENTION

The invention proposes an allocation of resources implemented by a cellular access network comprising a base station which optimizes the D2D communication performance levels at the access network level.

The subject of the invention is a method for allocating resources to at least one terminal of a set of N pairs of terminals of index n, N≥2, that are candidates for a direct communication, called D2D terminals. The channel between two D2D terminals in direct communication is called D2D channel. The base station has knowledge of a statistic concerning the state of the D2D channels. The method comprises, for a transmission interval:
  a determination, by the base station, of a subset out of different subsets of D2D terminals of the set which statistically minimizes the utility function $v_n(t)$,
  a request from the base station to the D2D terminals of the subset asking them to simultaneously report a minimum power and a maximum bit rate which minimize their utility metric,
  a determination, by each D2D terminal of the subset, of a minimum power and a maximum bit rate which minimize its utility metric,
  a reporting by the D2D terminals of the subset to the base station of their determined minimum power and maximum bit rate,
  a determination, by the base station, of a D2D terminal, out of the D2D terminals of the subset, for which the utility function applied to its reported power and bit rate is minimal so as to allocate to it spectral resources to transmit during the transmission interval.

Advantageously according to the invention, only the D2D terminals of the subset determined by the base station give feedback on the instantaneous state of their D2D channel and on their power needed to achieve a minimum bit rate. The reporting of information to the base station is therefore restricted to the subset which makes it possible to limit the signaling overload. The instantaneous state of the D2D channel and the necessary power reported are used to calculate the energy efficiency of the D2D communications.

The knowledge of the channel involves, for the networks of LTE type defined by the 3GPP, a feedback channel with which a signaling is associated. This feedback channel is standardized for the terminals served by the base station.

According to the invention, the base station determines the subset of D2D terminals on the basis of a statistical knowledge of the state of the D2D channels. This statistic can be obtained from one or more known propagation models associated with the different D2D channels. Another embodiment consists in determining the statistic from different reportings of information linked to the state of the D2D channels over a given time period. This statistic can be an average. The estimation of a D2D channel can be made by the measurement of reference signals known to the transmitter and the receiver of a D2D pair in much the same way as the DMRS reference signals (Demodulation Reference Signals) are used in the 3GPP LTE standard. The reporting of the state of the channel (channel estimation) can be done through the use of a PUCCH format 2b control channel of the 3GPP LTE standard.

From the data reported by the subset chosen by the base station and which represent the instantaneous values of the D2D communications, the base station determines the D2D terminal which maximizes an instantaneous energy efficiency metric. Only this terminal of the subset is then allocated a resource to transmit over the transmission interval.

Also a subject of the invention is a base station suitable for implementing a method for allocating transmission resources according to the invention. The base station comprises:
 a processor for determining a subset $\Delta^*$, out of different subsets of D2D terminals of the set, which statistically minimizes a utility function $v_n(t)$,
 a transmitter for transmitting a request to the D2D terminals of the subset asking them to simultaneously report a minimum power and a maximum bit rate which minimize their utility metric,
 a receiver for receiving, from each terminal of the subset, a minimum power and a maximum bit rate which minimize the utility metric of the terminal,
 a processor for determining a D2D terminal, out of the D2D terminals of the subset $\Delta^*$, for which the utility function applied to its reported power and bit rate is minimal and for allocating to it the spectral resources to transmit during the transmission interval.

Another subject of the invention is an access network comprising at least one base station according to a subject matter of the invention.

Another subject of the invention is a D2D terminal suitable for implementing a method for allocating transmission resources according to the invention. The terminal comprises:
 a receiver for receiving a request originating from the base station asking it to simultaneously report a minimum power $P_{n,m*}(t)$ and a maximum bit rate $R_{m*}$ which minimize a utility metric,
 a processing unit for determining its minimum power $P_{n,m*}(t)$ and its maximum bit rate $R_{m*}$ which minimize this utility metric,
 a transmitter for transmitting, via a return path to the base station, its determined minimum power $P_{n,m*}(t)$ and maximum bit rate $R_{m*}$.

The receiver of the terminal receives the spectral resources which are allocated to it by the base station to transmit during the transmission interval.

According to one embodiment of the invention, the determination of the subset, out of different subsets of D2D terminals of the set, which statistically minimizes a utility function $v_n(t)$ consists in determining the subset which minimizes the average of the sum of the minimum transmitted powers subject to the constraint of maximizing the bit rates.

According to one embodiment of the invention, the base station determines as many subsets as there are different transmission resources that can be allocated simultaneously during one and the same transmission interval (for example with access of OFDMA or TDMA or CDMA type).

According to one embodiment of the invention, the access network is of LTE type and the request from the base station uses a downlink control channel PDCCH of the access network.

According to one embodiment of the invention, the access network is of LTE type and the power reported is quantified by at most two bits of a control channel PUCCH.

The invention applies also to a computer program, notably a computer program on or in an information medium, suitable for implementing the invention. This program can use any programming language, and be in the form of source code, object code, or intermediate code between source code and object code, such as in a partially compiled form, or in any other form desirable to implement a method for allocating transmission resources according to the invention. This program can have several modules intended for different entities such as the base station and the D2D terminals.

The information medium can be any entity or device capable of storing the program. For example, the medium can comprise a storage means, such as a ROM, for example a CD ROM or a microelectronic circuit ROM, or even a magnetic storage means, for example a diskette (or floppy disk) or a hard disk.

Alternatively, the information medium can be an integrated circuit in which the program is incorporated, the circuit being adapted to execute or to be used in the execution of the method concerned.

Also, the program can be translated into a transmissible form such as an electrical or optical signal, which can be routed via an electrical or optical cable, wirelessly or by other means. The program according to the invention can in particular be downloaded over a network of Internet type.

LIST OF FIGURES

Other features and advantages of the invention will become apparent from the following description of examples given as nonlimiting examples, the description being given in light of the following attached figures.

DESCRIPTION OF EMBODIMENTS OF THE INVENTION

Figure 1:
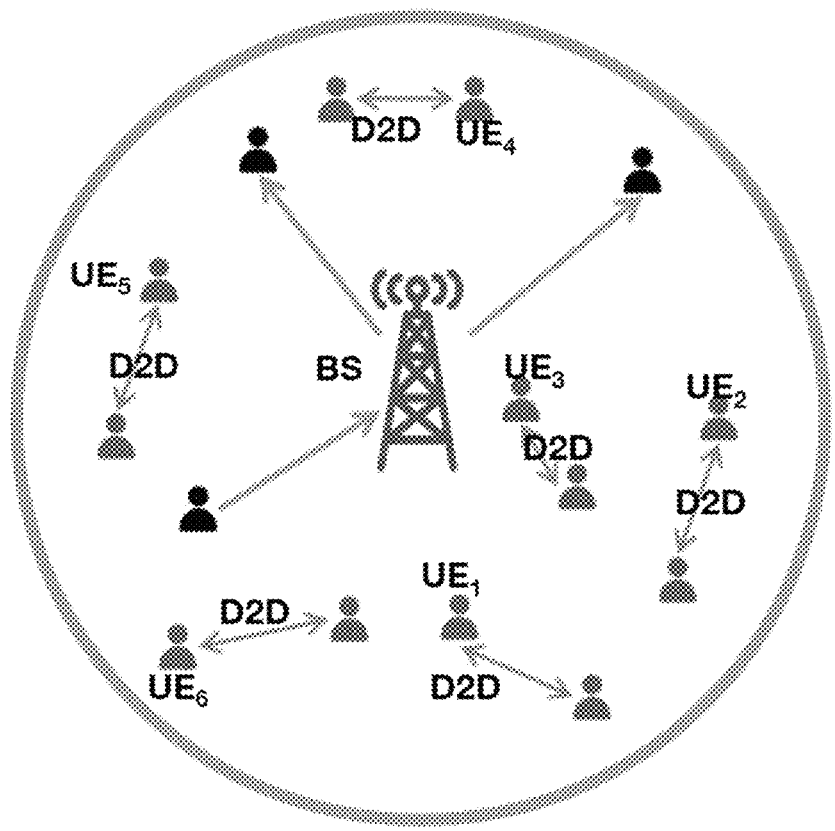
FIG. 1 is a diagram of an access network with a base station and D2D terminals identified by this station.

An access network is illustrated in FIG. 1. A single base station BS is represented for the purposes of simplification but the access network can comprise other base stations.

The coverage zone is represented very schematically by a circle centered on the base station. Obviously, this zone in reality has an outline which depends on the environment, this environment influences in particular the propagation conditions and therefore the range in a given direction. The terminals identified by the base station are represented as distributed more or less evenly around the base station. It is understood that this representation is used for the purposes of illustration and that, in reality, the distribution is totally random.

A terminal which is allocated a spectral resource by the base station for the setting up of a communication relayed by that station is said to be served. However, when the station has allocated all its spectral resources it is at full load and can no longer serve terminals asking for a communication to be set up.

Upon the request to set up the communication, the base station knows the identifier of the recipient. By comparing with a list of terminals identified in its coverage zone, the base station can determine whether the recipient is on that list. Thus, the base station can identify pairs of D2D terminals that can set up the direct communication.

The access network thus comprises a set $\Omega$ of $N \geq 2$ pairs of D2D terminals, N=6 according to the illustration. For the purposes of simplification, if resources are allocated to the D2D terminals then they are different from the resources allocated to the cellular terminals (i.e. for which the communication is relayed by the base station). Thus, the interferences caused by the D2D terminals on the cellular terminals are, by construction, minimized.

The links between the different nodes of the system are subject to fading effects (Rayleigh fading) and to gaussian white noise. The channel gains are assumed constant during a transmission time slot (or simply time slot). They change independently from one transmission time slot to another by following a complex Gaussian distribution of zero mean and unit variance.

A mechanism between the D2D pairs allows the transmitting terminal $UE_1, \ldots, UE_6$ of the pair to know a CSI (Channel State Information) status of the corresponding D2D channel. See for example [3] which describes the use of reference signals to determine the channel gain between the transmitter and the receiver of the $n^{th}$ D2D pair in a way that is comparable to the use made in LTE of the demodulation reference signals DMRS which are incorporated in the transmission signal. It is therefore considered that a transmitter $UE_n$ of a D2D pair can estimate an instantaneous state (for example the channel gain $h_n$) of the D2D channel on each transmission time slot. This terminal UE can deduce therefrom the power $P_n(t)$ and the bit rate $R_n(t)$ which minimize a known determined utility function $v_n(P_n(t), R_n(t))$ of the D2D terminals. This utility function depends on the state $h_n$ of the channel.

Figure 2:
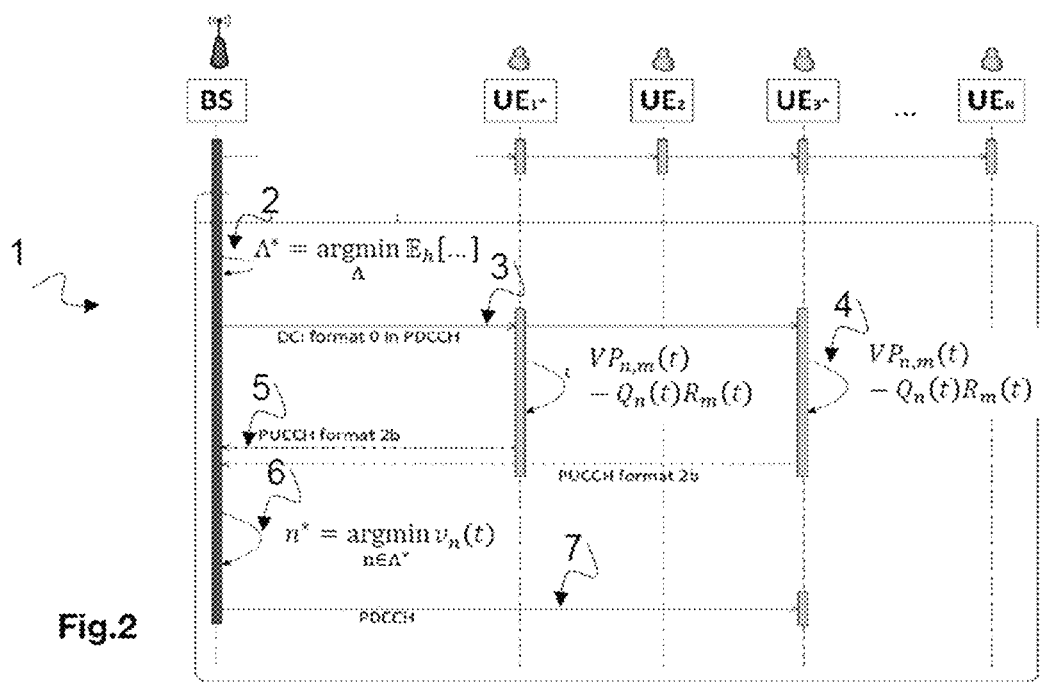
FIG. 2 is a flow diagram of an embodiment of a method according to the invention.

A method for allocating transmission resources according to the invention is detailed hereinbelow and illustrated by the flow diagram represented in FIG. 2. The flow diagram illustrated corresponds to an implementation in an access network that is compatible with a 3GPP LTE standard.

It is considered that a few radio resources are available for the transmitters $UE_1, \ldots, UE_6$ of the D2D pairs in each transmission time slot for the reporting of information on the state of the D2D channels. For example, a limited number of resource blocks $N_{RB}$ is available on each transmission time slot TTI, with reference to the LTE standard. From this feedback, the base station BS regularly calculates a statistic concerning the state of all the D2D channels.

The bit rate in bit/s R associated with a link is assumed to correlate directly with the radio performance levels of this link, i.e. the signal-to-noise ratio SNR in reception (the correlation can result from the calculation bit rate=log (1+SNR) or result from a mapping performed on completion of the link simulations).

The access network is parameterized with a set of M SNR thresholds $\{\gamma_1, \ldots, \gamma_M\}$ used to quantify the SNR in reception of each of the D2D links if a D2D link has an SNR lying between two thresholds of the set then its SNR is chosen to be equal to the lower threshold, $\gamma_i \leq SNR < \gamma_{i+1} \Rightarrow SNR = \gamma_i$. Thus, the system distinguishes M bit rates $\{R_1, \ldots, R_M\}$ which correlate directly with the M SNR thresholds $\{\gamma_1, \ldots, \gamma_M\}$, i.e. if the D2D link has an SNR $\gamma_i$ then it makes it possible to achieve a bit rate $R_i$.

An LTE network identifies fifteen values for the quality of a channel that are coded with an index on four bits to which fifteen bit rate values correspond: $\{R_1, \ldots, R_M\} = \{R_1, \ldots, R_{15}\}$. Therefore $R_n(t) \in \{R_1, \ldots, R_{15}\}$.

To achieve the bit rate $R_i$, the transmission power of the transmitter of the D2D link $n \in N$ is determined by:

$$P_{n,i} = \min\left\{ \frac{\gamma_i N_o}{|h_n|^2 L_n}, P_{max} \right\} \quad (1)$$

with $h_n$ the fading coefficient of the D2D link n also called gain of the channel, $L_n$ is the attenuation of the link (path loss) which depends essentially on the distance $d_n$ between the terminals of the D2D pair, $N_o$ is the power of the noise on reception and $P_{max}$ is the maximum power available to the transmitter $UE_1, \ldots, UE_6$ of the D2D pair.

The access to the channel is assumed to be of TDMA type such that only a single D2D communication benefits from resources in each transmission time slot. In other words, no more than one D2D terminal is allocated any resources in each transmission time slot.

For a given transmission time slot t, the following notations are used:

$H(t)=[h_1, h_2, \ldots, h_N]$ the vector of the state of the channels (channel gains) of the N D2D pairs, $R_n(t)$ is the bit rate of the $n^{th}$ D2D communication, $P_n(t)$ is the transmission power for this $n^{th}$ D2D communication, $R_{th}$ is the bit rate threshold averaged over time (time average throughput) which corresponds to the SNR threshold $\gamma_{th}$, P(t) is the matrix of dimensions N×M of the powers of the N pairs of D2D terminals to obtain the M bit rates $\{R_1, \ldots, R_M\}$:

$$P(t) = \begin{bmatrix} P_{1,1} & P_{1,2} & \ldots & P_{1,M} \\ P_{2,1} & P_{2,2} & \ldots & P_{2,M} \\ \ldots & \ldots & \ldots & \ldots \\ P_{N,1} & P_{N,2} & \ldots & P_{N,M} \end{bmatrix}$$

(the variable t has been eliminated from the matrix so as not to overload it)

The method according to the invention provides a solution to an optimization problem. This problem consists, in each transmission time slot, in proposing a selection (strategy) $\Gamma$ which identifies which information to be reported on the state of the channels and jointly identifies the terminal to which a resource is allocated while observing a limitation of the available resources for the information feedback in order to minimize the energy consumption of the D2D communications subject to the constraint of an average bit rate (throughput). This problem can be written in the form:

$$\min_{\Gamma} \lim_{T \to \infty} \sup \frac{1}{T} \sum_{t=1}^{T} \sum_{n=1}^{N} \mathbb{E}[P_n(t)] \quad (2)$$

subject to the constraint that $$\lim_{T \to \infty} \inf \frac{1}{T} \sum_{t=1}^{T} \mathbb{E}[R_n(t)] \geq R_{th}, \forall n$$

The use of Lyapunov technique [4] makes it possible to describe the optimization problem (2) differently by introducing virtual queues $Q_n$, $Q_n(t+1)=\max((Q_n(t)-R_n(t), 0)+R_{th}$.

Q is the vector of the virtual queues for all the transmitters $UE_n$ of the pairs of D2D terminals: $Q=[Q_1, Q_2, \ldots, Q_N]$.

The optimization problem (2) then amounts to minimizing the energy consumption of the access network while guaranteeing the stability of the queues and to do so even though the resources available for the feedback are limited.

The stability of the queues is obtained by minimizing the following expression:

$$\min_{\Gamma} \sum_{n=1}^{N} V \mathbb{E}[P_n(\Gamma(t))] - Q_n(t) \mathbb{E}[R_n(\Gamma(t))] \quad (3)$$

with V a positive real (weight) so-called Lyapunov constant chosen so as to allow the compromise between the minimization of the power and the size of the queues.

According to the method 1, the base station BS determines 2 a subset $\Lambda^*$ out of the different subsets $\Lambda$ of the set $\Omega$ of the D2D terminals. This subset $\Lambda^*$ is made up of $K^{(1)}$ transmitting terminals $UE_1, \ldots, UE_{K^{(1)}}$ of D2D pairs each of channel $h_n$ which statistically minimize a utility function $v_n(t)$, that is to say which on average minimize the sum of the transmitted powers $P_n(t)$ subject to the constraint of maximizing the bit rates $R_n(t)$:

$$\Lambda^* = \underset{\Lambda \subset \Omega}{\operatorname{argmin}} \mathbb{E}_h \left[ \sum_{n \in \Lambda} v_n(P_n(t), R_n(t)) \right]$$

$$\Lambda^* = \underset{\Lambda \subset \Omega}{\operatorname{argmin}} \mathbb{E}_h \left[ \min_{n \in \Lambda} [VP_n(t) - Q_n(t)R_n(t)] \right]$$

In other words, the subset $\Lambda^*$ maximizes an averaged energy efficiency metric.

The method comprises a request 3 from the base station to the $K^{(1)}$ D2D terminals of the subset $\Lambda^*$ asking them to simultaneously report a minimum power and a maximum bit rate which minimize their respective utility metrics (thus maximizing the energy efficiency).

For a deployment in an LTE network, the request can take the form of a PDCCH (Physical Downlink Channel Control) control signal with downlink control information DCI of format 0.

On receipt of this request, the D2D terminals of the subset determine 4, via the equation (1), a level of power subject to the constraint of achieving the bit rate deduced from the instantaneous state of the channel to maximize the energy efficiency metric. Each D2D terminal of the subset determines the index $m^* \in \{1, \ldots, M\}$ which minimizes its utility metric $VP_{n,m}(t)-Q_n(t)R_m(t)$ for a given instantaneous channel value.

The terminals which receive this request use their estimation of the channel to find the pair (power, bit rate) which minimize their utility function $v_n(t)$. In other words, the transmitting D2D terminal uses its estimation of the D2D channel $h_n$ to calculate the fifteen transmission powers necessary to respectively achieve each of the fifteen bit rates (R1 ... R15) by using the equation (1). Out of these fifteen power and bit rate pairs, the D2D terminal chooses the pair which minimizes its utility function $v_n(t)$ (with $Q_n$ known by the D2D terminal and whose value varies according to the equation $Q_n(t+1)=(Q_n(t)-R_n(t))^+ +R_{th})$. Thus, each transmitting D2D terminal of the subset determines the index $m^* \in \{1, \ldots, M\}$ which minimizes its utility metric $VP_{n,m}(t)-Q_n(t)R_m(t)$ for a given instantaneous channel value.

This therefore amounts, for a terminal of a D2D pair, to determining the minimum power to achieve a maximum bit rate subject to the constraint of energy efficiency. Knowing the index $m^*$, the D2D terminal determines the power and the corresponding bit rate which optimize its utility function: $R_n(t)=R_{m^*}$, $P_n(t)=P_{n,m^*}(t)$ The D2D terminals of the subset report 5 to the base station the power and bit rate pair which minimizes their utility function.

Now consider an LTE network which identifies $N_{RB}$ radio resources for the reporting of information from the terminals to the base station. This reporting can be done in an LTE network by means of a PUCCH (Physical Uplink Control Channel) format 2b control signal.

For the downlink transmissions, the LTE standard essentially defines two PUCCH signal formats depending on the type of information processed:
  the formats 1, 1a or 1b with one or two coded bits dedicated to the return of acknowledgements ACK/NACK,
  the formats 2, 2a or 2b with twenty to twenty-two coded bits dedicated to returning channel state information CSI, grouped together in three components: the rank index RI, the precoding matrix index PMI and the channel quality index CQI. These three components are determined by the (receiving) terminal from the estimation of the instantaneous state of the downlink channel performed by exploiting downlink pilots.

A PUCCH control signal with format 2b comprises a CQI (Channel Quality Indicator) and two bits to code an acknowledgement of good reception or of bad reception ACK/NACK. The bits reserved for the CQI code a value representative of the bit rate.

According to this illustrated embodiment of the method 1, the reporting of the power is coded by using the bits reserved for the acknowledgment, Thus, the power which follows continuous values is quantified by mapping it onto the four values: $\{\tilde{P}_1, \tilde{P}_2, \tilde{P}_3, \tilde{P}_4\}$, the reported power $\tilde{P}_n(t) \in \{\tilde{P}_1, \tilde{P}_2, \tilde{P}_3, \tilde{P}_4\}$. It is then possible, according to the LTE standard, to determine the maximum number $K^{(1)}$ of CSI feedbacks that can be performed simultaneously given the 2b format chosen for the PUCCH control signal. $K^{(1)}$ is the product of two values:
  $N_{RB}$ the number of resource blocks (RB) available for a PUCCH format 2, 2a or 2b control channel in each transmission time slot TTI for CSI reporting, $C_{MUX}$ which gives the multiplexing capacity by RB, that is to say the number of users which can report their CSI on the same PRB. For an LTE network, $C_{MUX}=12$ Therefore $K^{(1)}=N_{RB} \times C_{MUX}=12 N_{RB}$ According to this implementation of the method, the acknowledgement of good reception or of bad reception ACK/NACK is coded only for the PUSCH or PUCCH format 1, 1a or 1b control signals.

The base station determines 6 the D2D terminal n* out of the D2D terminals of the subset Λ* which maximizes the instantaneous energy efficiency metric. The base station calculates the utility function $v_n$ of each of the D2D terminals of the subset Λ* by using the $K^{(1)}$ values reported from the $K^{(1)}$ terminals of the subset Λ*. The D2D terminal n* is that for which the utility function $v_n$ is minimal:

$$n^* = \underset{n \in \Lambda^*}{\mathrm{argmin}}\, v_n(t) = \underset{n \in \Lambda^*}{\mathrm{argmin}}[V\tilde{P}_n(t) - Q_n(t)R_n(t)] \quad (5)$$

The base station allocates, to this D2D terminal n*, spectral resources to allow it to transmit during the transmission time slot t.

The base station updates its statistic on the state of all the channels by using the $K^{(1)}$ reported values.

The method 1 leads to a distance that is at most equal to $$O\left(\frac{1}{V}\right)$$

from the optimal solution denoted $P^*_c$ to the optimization problem that is reflected by the equations (2) while guaranteeing the stability of the virtual queues system. The demonstration thereof is given in Annex A.

According to one embodiment, the spectral resources of the access network are subdivided into several resource blocks. Each resource block can be the subject of an allocation to a D2D terminal which can be different between the blocks. The allocation method according to the invention can thus be implemented for at least two of the blocks and possibly for each of the different blocks and lead to the allocation to different terminals of different resource blocks.

Simulations have been performed in the context of an LTE system with the parameters given in Table 1 in Annex A Since LTE considers sixteen different values for a CQI, the simulations considered sixteen bit rates i.e. M=15. The values of these bit rates $\{R_1, \ldots, R_{15}\}$ correspond to the SNR set $\{\gamma_1, \ldots, \gamma_{15}\}=\{0, 1, \ldots, 14\}$dB. The N pairs of D2D terminals are assumed to be distributed uniformly in the cell. The access to the communication network of these terminals depends on the resource allocation method.

Figure 3:
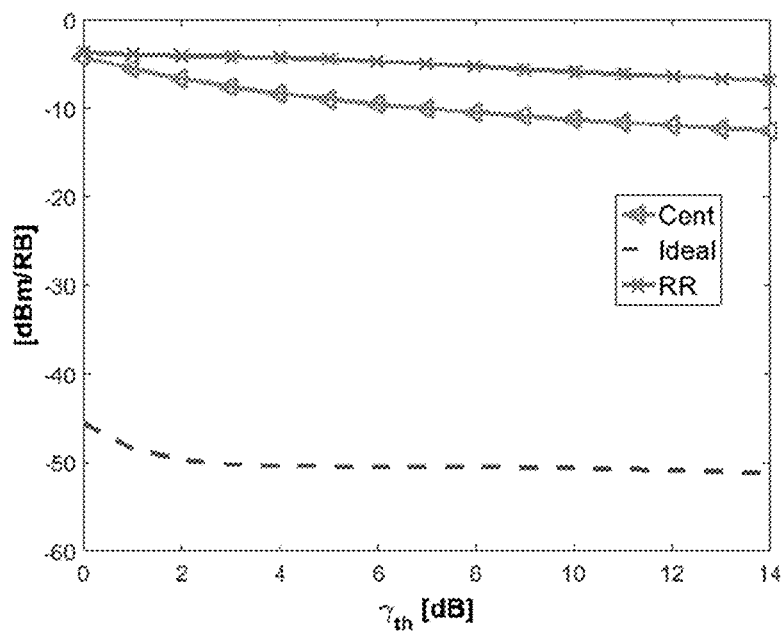
FIG. 3 represents curves obtained from simulations of the power consumed in dB/RB as a function of the SNR threshold $\gamma_{th}$ in dB for different resource allocation methods.

FIG. 3 gives curves of transmission power in dB/RB as a function of the SNR threshold $\gamma_{th}$ in dB. The curves correspond to a resource allocation method according to the invention (line with arrows), to an ideal resource allocation method (dotted line) and to a round robin resource allocation method (line with crosses).

The ideal resource allocation method is based on the knowledge by the base station of the state of all the D2D channels. According to the round robin resource allocation method, each subset Λ of the set Ω of the D2D terminals is allocated resources identically and circularly in time.

The comparison of the curves makes it possible to observe that the centralized method according to the invention reduces the transmitted power expended on average by comparison to the round robin method for different SNR threshold values, $0 \leq \gamma_{th} \leq 14$ dB.

Figure 4:
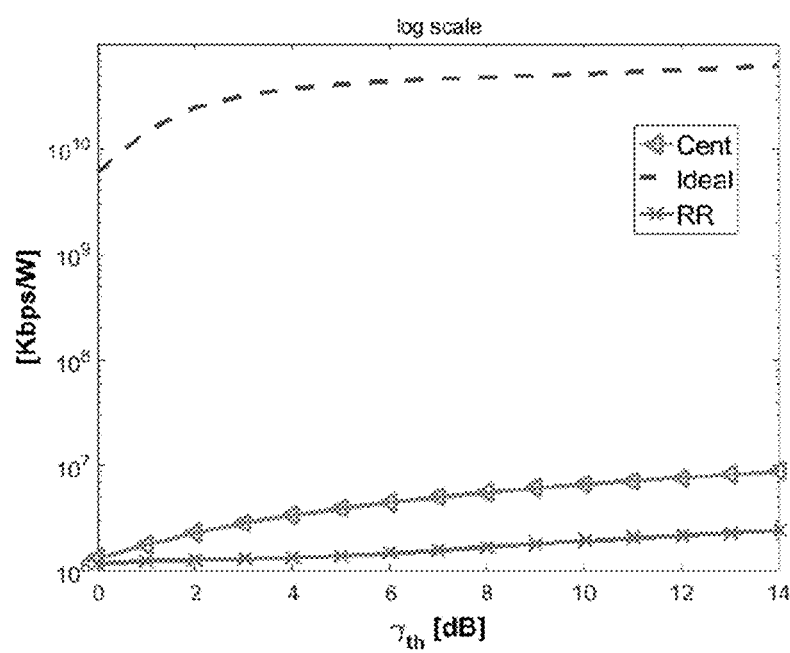
FIG. 4 represents curves obtained from energy efficiency simulations for different resource allocation methods.

FIG. 4 gives curves of energy efficiency for the same resource allocation methods as those considered for FIG. 3. The energy efficiency is evaluated as being the ratio between the total bit rate (or total throughput) and the total transmitted power for the duration of all the simulations. Thus, FIG. 4 represents the trend of the energy efficiency in Kbps/W (ratio between the total bit rate in kbits/s and the transmitted power in W) of the different methods as a function of the SNR threshold $\gamma_{th}$ in dB. The comparison of the curves highlights the fact that the centralized method according to the invention enhances the energy efficiency by comparison to the round robin method for different SNR threshold values, $0 \leq \gamma_{th} \leq 14$ dB.

Figure 5:
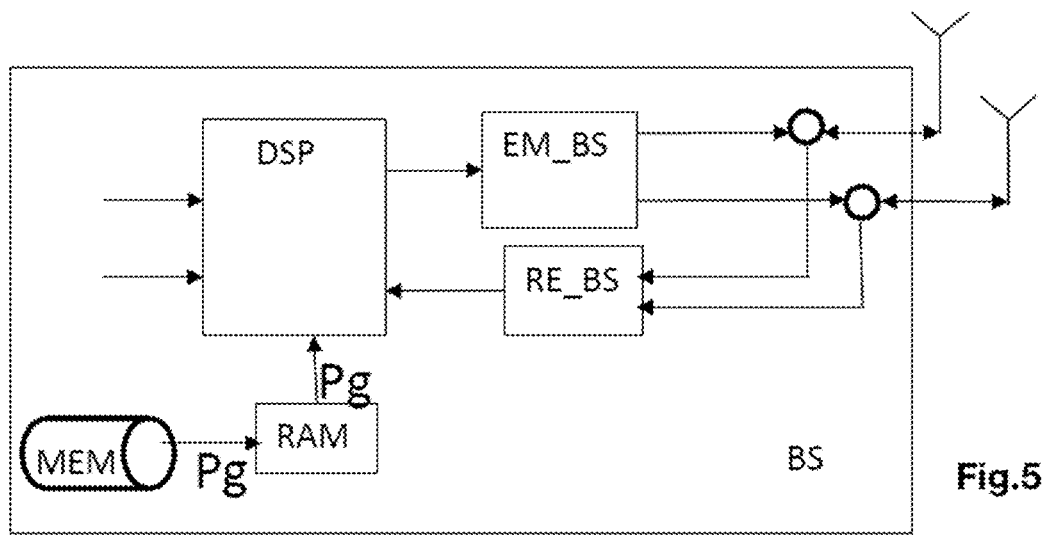
FIG. 5 is a diagram of a simplified structure of a base station implementing a method for allocating transmission resources according to the invention.

The simplified structure of a base station according to the invention implementing a resource allocation method described previously is described hereinbelow and illustrated by FIG. 5.

Such a base station BS comprises a transmitter EM_BS, a receiver RE_BS, a memory MEM comprising a RAM buffer memory, a processing unit DSP, equipped for example with a microprocessor and driven by the computer program Pg or possibly a specific module of the computer program Pg implementing the resource allocation method according to the invention.

On initialization, the code instructions of the computer program Pg are for example loaded into the RAM memory before being executed by the processor of the processing unit DSP.

The processing unit DSP determines a subset Δ* out of different subsets of D2D terminals of the set Ω which statistically minimizes a utility function $v_n(t)$.

The transmitter EM_BS transmits a request to the D2D terminals of the subset Δ* asking them to simultaneously report a minimum power $P_{n,m*}(t)$ and a maximum bit rate $R_{m*}(t)$ which minimize their utility metric.

The receiver RE_BS receives, via a feedback channel, a minimum power $P_{n,m*}(t)$ and a maximum bit rate $R_{m*}(t)$ originating from each terminal of the subset Δ* which minimize the utility metric of the terminal.

The processing unit DSP receives as input the minimum powers $P_{n,m*}(t)$ and the maximum bit rates $R_{m*}(t)$. The microprocessor of the processing unit DSP implements the resource allocation method described previously, according to the instructions of the computer program Pg. For that, the processing unit DSP driven by the microprocessor determines a D2D terminal, for which the utility function applied to its reported power and bit rate is minimal between all the D2D terminals of the subset Δ*. The processing unit DSP allocates spectral resources to this terminal to transmit during the transmission time slot. This terminal is that out of the terminals of the subset which maximizes an energy efficiency metric.

Figure 6:
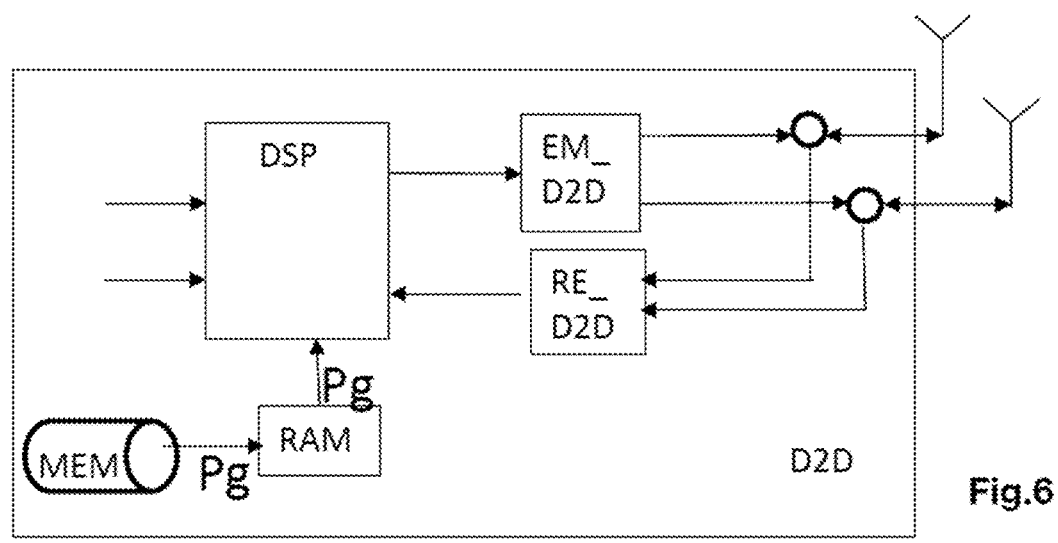
FIG. 6 is a diagram of a simplified structure of a D2D terminal implementing a method for allocating transmission resources according to the invention.

The simplified structure of a D2D terminal according to the invention implementing a resource allocation method described previously is detailed hereinbelow and illustrated by FIG. 6.

Such a D2D terminal comprises a transmitter EM_D2D, a receiver RE_D2D, a memory MEM comprising a RAM buffer memory, a processing unit DSP, equipped for example with a microprocessor and driven by the computer program Pg or possibly a module of the computer program Pg implementing the resource allocation method according to the invention.

On initialization, the code instructions of the computer program Pg are for example loaded into the RAM memory before being executed by the processor of the processing unit DSP. The microprocessor of the processing unit DSP implements the resource allocation method described previously, according to the code instructions of the computer program Pg.

Thus, the receiver RE_D2D receives a request originating from the base station asking it to simultaneously report a minimum power $P_{n,m*}(t)$ and a maximum bit rate $R_{m*}(t)$ which minimize its utility metric.

The processing unit DSP determines its minimum power $P_{n,m*}(t)$ and its maximum bit rate $R_{m*}(t)$ which minimize its utility metric.

The transmitter EM_D2D transmits, via a feedback channel to the base station, its determined minimum power $P_{n,m*}(t)$ and maximum bit rate $R_{m*}(t)$.

The receiver RE_D2D receives an identification of the spectral resources which are allocated to it by the base station to transmit during the transmission time slot. This D2D terminal is that out of the terminals of the subset which maximizes an energy efficiency metric.

Although the invention is detailed above on the basis of an embodiment based on an LTE cellular network, the invention can perfectly well also be used in a wireless network context, for example one of WiFi type. In this case, the base station is better known as access point.

REFERENCES

[1] K. Doppler, M. Rinne, C. Wijting, C. Ribeiro, and K. Hugl, "Device-to-device communication as an underlay to lte-advanced networks," *IEEE Commun. Mag.*, vol. 47, no. 12, pp. 42-49, 2009.

[2] A. Aijaz, M. Tshangini, M. Nakhai, X. Chu, and A. Aghvami, "Energy-efficient uplink resource allocation in LTE networks with M2M/H2H co-existence under statistical qos guarantees," Communications, IEEE Transactions on, vol. 62, pp. 2353-2365, 07 2014.

[3] IEEE «Design Aspects of Network Assisted Device-to-Device Communications» by Gábor Fodor, Erik Dahlman, Gunnar Mildh, Stefan Parkvall, Norbert Reider, György Miklos and Zoltán Turányi, published in March 2012 in the Communications Magazine review

[4] M. J. N. L. Georgiadis and L. Tassiulas, Resource allocation and cross-layer control in wireless networks, 2006, chapter 4 sections 4.4 and 4.5, pages 49-57.

Annex A

The method according to the invention satisfies the following propositions 1 and 2.

Proposition 1.

The totality of the queues of the virtual queues is on average below a finite value $$\frac{C+B}{\epsilon}$$

$$\lim_{T\to\infty} \sup \frac{1}{T} \sum_{t=0}^{T-1} \sum_{i=1}^{N} \mathbb{E}[Q_i(t)] \leq \frac{C+B}{\epsilon} \tag{6}$$

The resource allocation method according to the invention ensures a high stability of the virtual queue system with an average wait in the queues of o(V). Thus, the bit rate (or throughput) constraint of the optimization problem is satisfied.

Proposition 2

The time average of the transmitted power bears out the following equation:

$$P_c^* \leq \lim_{T\to\infty} \sup \frac{1}{T} \sum_{t=1}^{T} \sum_{n=1}^{N} \mathbb{E}[P_n(t)] \leq P_c^* + \frac{C}{V} \tag{7}$$

Demonstration of Proposals 1 and 2

The Lyapunov function $L_Q(t)$ is given by the relationship $$L_Q(t) := \frac{1}{2} \sum_{i=1}^{N} Q_i^2(t)$$

By following the same methodology as in [4], it can be proven that the "drift-plus-penalty" expression is bounded by the following upper bound:

$$\Delta(Q(t)) := \Delta(L(t)) + V \sum_{i=1}^{N} \mathbb{E}[(P_i(t)|Q(t))] \leq C + \sum_{i=1}^{N} Q_i(t) R_{th} - \tag{19}$$

$$\mathbb{E}\left[\sum_{n=1}^{N} Q_i(t) R_i(\Gamma(t), H(t)|Q(t))\right] + V \mathbb{E}\left[\sum_{n=1}^{N} P_i(t)(\Gamma(t), H(t)|Q(t))\right]$$

with $\Gamma(t)$ the selection (strategy) which identifies which terminals will report their D2D channel state and jointly identifies the terminal to which a resource is allocated and C is a constant such that:

$$\mathbb{E}\left[\sum_{i=1}^{N} \frac{R_{th}^2 + R_i^2(t)}{2} |Q(t)\right] \leq C$$

In each time slot, the method according to the invention satisfies the following equation:

$$\mathbb{E}\left[\sum_{i=1}^{N} [VP_i(\Gamma(t), H(t)) - Q_i(t) R_i(\Gamma(t), H(t))]|Q(t)\right] \leq \tag{20}$$

$$\mathbb{E}\left[\sum_{i=1}^{N} [VP_i(\Gamma^*(t), H(t)) - Q_i(t) R_i(\Gamma^*(t), H(t))]|Q(t)\right]$$

in which $\Gamma^*(t)$ is the optimal selection of the terminals which report their D2D channel state and the terminal to which a resource is allocated.

Verification of the equation (20): at each time slot t, the method determines, on the basis of a global statistic of the CSIs, the subset $\Lambda^*$ of the D2D terminals which will report their instantaneous CSI in accordance with the equation (4). The terminal $n^*$ that is scheduled is that which has the smallest value $v_n(t) = V\tilde{P}_n(t) - Q_n(t) R_n(t)$. The method checks inequality (20) for all selections $\Gamma^*(t)$ of CSI feedback and of resource allocation including the optimal selection of the equation (2).

The optimal solution Γ*(t) bears out the optimization problem (2) and thus guarantees the stability of the queues. By assuming that the vector of arrival of the bit rates is below the region of stability of the queues system, then:

$$\mathbb{E}_{[R_i(\Gamma^*(t))|Q(t)]} = \mathbb{E}_{[R_i(\Gamma^*(t))] \geq R_{th} + \epsilon} \text{ with } \epsilon > 0 \quad (5)$$

The same methodology as in [4] gives:

$$\lim_{T \to \infty} \sup \frac{1}{T} \sum_{t=0}^{T-1} \sum_{i=1}^{N} \mathbb{E}[Q_i(t)] \leq \frac{C+B}{\epsilon} \quad (21)$$

with B a finite constant such that $$P_c^* = \lim_{T \to \infty} \sup \frac{1}{T} \sum_{t=0}^{T-1} \sum_{i=1}^{N} \mathbb{E}[VP_i(\Gamma^*(t))] \leq B$$

The preceding expression sets an upper limit on the total average arrears of the queues. Thus, all the queues of the system are highly stable. Consequently, each time the vector of bit rates on arrival is below the region of stability, the proposed selection Γ(t) ensures the high stability of the queues of the network with an average arrears of a queue which is inversely proportional to the distance between the bit rate vector and the boundary of the stability region. Hence the proof that the proposition 1 is borne out.
With the same methodology, it follows that:

$$\frac{1}{T} \sum_{t=0}^{T-1} \sum_{i=1}^{N} \mathbb{E}[P_i(t)] \leq \frac{C}{V} + \frac{\mathbb{E}[L_Q(0)]}{VT} + \frac{1}{T} \sum_{t=0}^{T-1} \sum_{i=1}^{N} \mathbb{E}[P_i(\Gamma^*(t))]$$

Hence the proof that the propositions 1 and 2 are borne out.

Hence the proof that the propositions 1 and 2 result from a simple application of the Lyapunov optimization for a queuing network.

Thus, the centralized method for CSI feedback and resource allocation achieves a performance with o(1/V) distance from the optimal performance.

TABLE 1

| Parameter | Value |
| --- | --- |
| Cell radius $R_d$ in m | 500 |
| Bandwidth | 10 MHz equivalent to 50RB |
| Distribution of terminals in the cell (UE drop) | Uniform distribution with $d_{min}$ = 3 m, $d_{max}$ = 350 m, between D2D pair distance UE – BS ≥ 35 m |
| N | 50 |
| Feedback parameter | $N_{RB}$ = 2, $\Delta_{shift}^{PUCCH}$ = 1, $N_{OC}$ = 3, ⇒ $K^{(1)}$ = 24 |
| $P_{max}$ in mW | 250 |
| Quantified power in mW | $\tilde{P}_1$ = 50, $\tilde{P}_2$ = 100 $\tilde{P}_3$ = 150, $\tilde{P}_3$ = 200 |
| Attenuation (path loss) | The path loss model given by table A.2.1.2 (first column outdoor-to-outdoor) of the 3GPP document TR 36.843 |
| Simulation parameters | $t_{simu}$ = $10^6$ ms, Nbit = 100 realizations |
| Noise density in dBm/Hz | −174 |
| V | $10^{14}$ |

The invention claimed is:

1. A method comprising:
allocating transmission resources, implemented by a cellular access network comprising a base station, to at least one terminal of a set of N pairs of terminals of index n N≥2, that are candidates for a direct communication, called D2D terminals, a channel between two D2D terminals in direct communication being called a D2D channel, the base station having knowledge of a statistic concerning a state of the D2D channels, wherein the allocating comprises, for a transmission interval:
determining, by the base station, a subset out of different subsets of D2D terminals of the set which statistically minimizes a utility function,
requesting from the base station to the D2D terminals of the subset asking them to simultaneously report a minimum power and a maximum bit rate which minimize their utility metric,
determining, by each D2D terminal of the subset, a minimum power and a maximum bit rate which minimize the D2D terminal's utility metric,
reporting by the D2D terminals of the subset to the base station of their determined minimum power and maximum bit rate,
determining, by the base station, a D2D terminal, out of the D2D terminals of the subset, for which the utility function applied to the D2D terminal's reported power and bit rate is minimal so as to allocate to the D2D terminal spectral resources to transmit during the transmission interval.

2. The method as claimed in claim 1, according to which the determination of the subset, out of different subsets of D2D terminals of the set, which statistically minimizes the utility function comprises determining the subset which minimizes the average of the sum of the minimum transmitted powers subject to the constraint of maximizing the bit rates.

3. The method as claimed in claim 1, according to which the base station determines as many subsets as different transmission resources that can be allocated simultaneously during one and the same transmission interval.

4. The method as claimed in claim 1, according to which the access network is of LTE type and the request from the base station uses a downlink control channel PDCCH of the access network.

5. The method as claimed in claim 1, according to which the access network is of LTE type and the reported power is quantified on at most two bits of a control channel PUCCH.

6. A base station for allocating transmission resources to at least one terminal of a set of N pairs of terminals of index n, N≥2, that are candidates for a direct communication, called D2D terminals, a channel between two D2D terminals in direct communication being called a D2D channel, the base station having knowledge of a statistic concerning a state of the D2D channels, wherein the base station comprises:
a processor configured to determine a subset, out of different subsets of D2D terminals of the set, which statistically minimizes a utility function,
a transmitter configured to transmit a request to the D2D terminals of the subset asking them to simultaneously report a minimum power and a maximum bit rate which minimize their utility metric,
a receiver configured to receive, from each terminal of the subset a minimum power and a maximum bit rate which minimize the utility metric of the terminal,
and wherein the processor is further configured to determine a D2D terminal, out of the D2D terminals of the subset, for which the utility function applied to the D2D terminal's reported power and bit rate is minimal, and for allocating to the D2D terminal spectral resources to transmit during the transmission interval.

7. The base station as claimed in claim 6, wherein the receiver is configured to extract the power reported by a D2D terminal from a PUCCH control message comprising at most two bits coding four power levels.

8. An access network comprising at least one base station as claimed in claim 6.

9. A D2D terminal of a set of N pairs of terminals of index n, N $\geq 2$, within the coverage of a base station, that are candidates for a direct communication, called D2D terminals, a channel between two D2D terminals in direct communication being called a D2D channel, wherein the D2D terminal comprises:
- a receiver configured to receive a request originating from the base station asking the D2D terminal to simultaneously report a minimum power and a maximum bit rate which minimize the utility metric,
- a processor configured to determine the D2D terminal's minimum power and the D2D terminal's maximum bit rate which minimize this utility metric,
- a transmitter configured to transmit, via a return path to the base station, the D2D terminal's determined minimum power and maximum bit rate,
- and wherein the receiver is further configured to receive spectral resources which are allocated to the D2D terminal by the base station to transmit during the transmission interval.

* * * * *